Oct. 20, 1953
C. R. TURNER
2,656,450
COOKER CONTROL APPARATUS
Filed Oct. 24, 1951
3 Sheets-Sheet 1
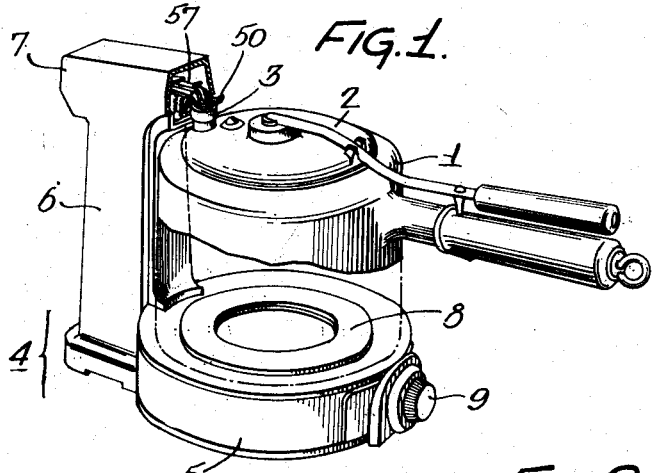
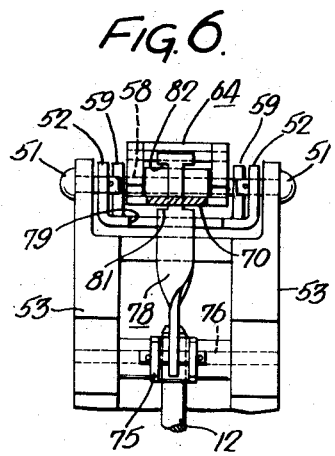
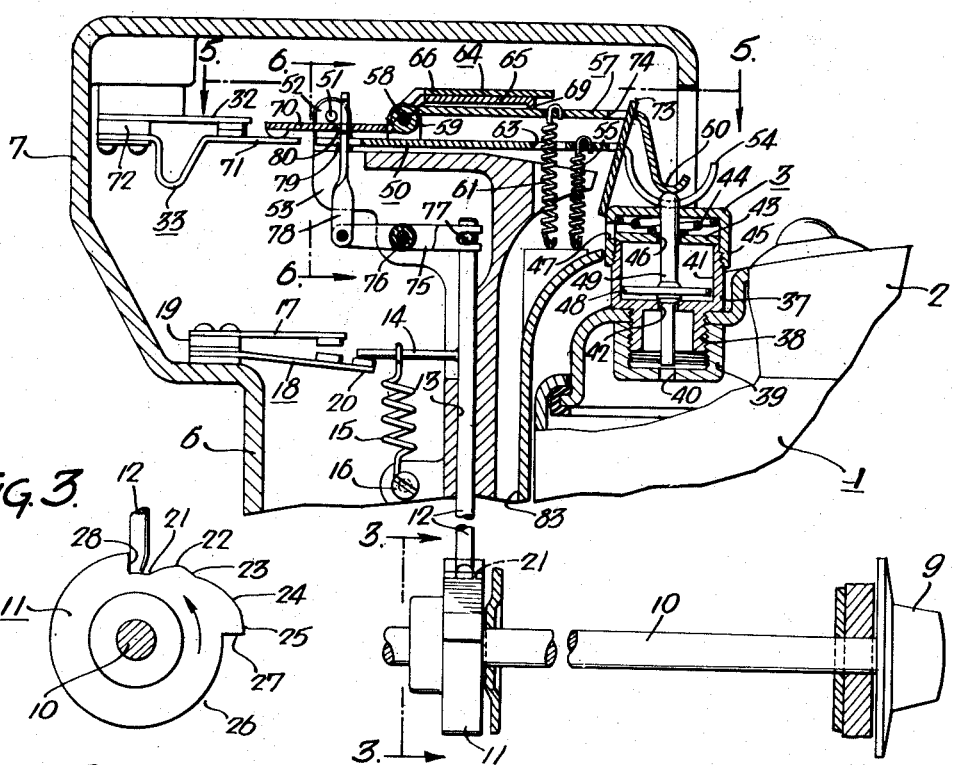
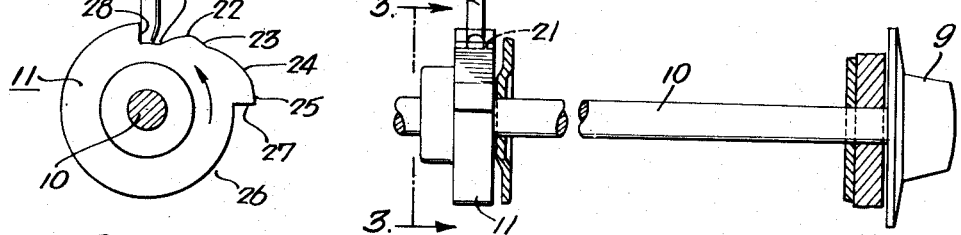
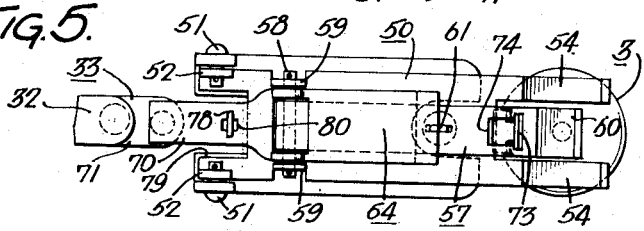
Inventor:
Charles Roger Turner
by his Attorneys
Howson &
Howson Oct. 20, 1953  C. R. TURNER  2,656,450
COOKER CONTROL APPARATUS
Filed Oct. 24, 1951  3 Sheets-Sheet 2
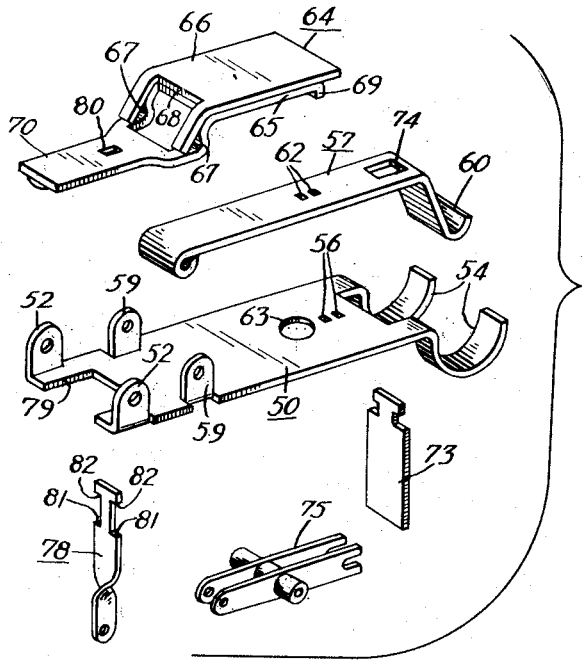
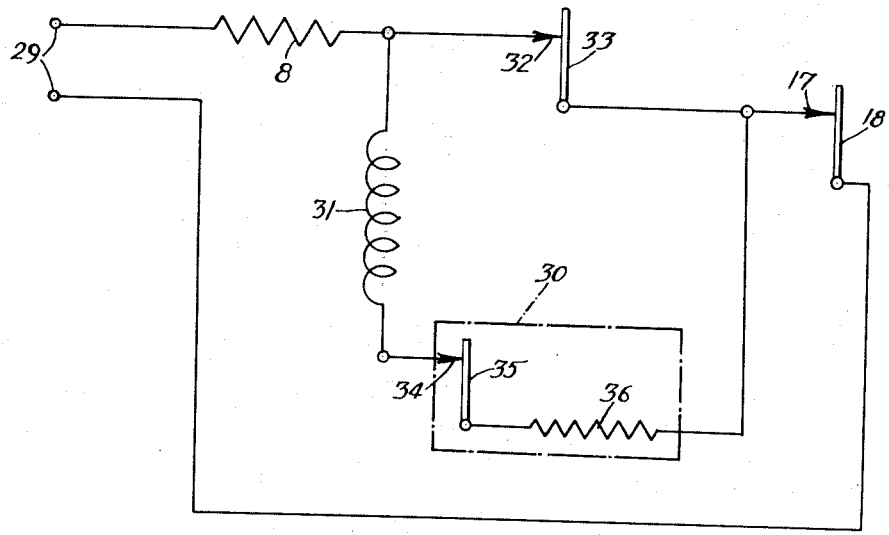
Inventor:
Charles Roger Turner
by his Attorneys
Howson & Howson Oct. 20, 1953  C. R. TURNER  2,656,450
COOKER CONTROL APPARATUS
Filed Oct. 24, 1951  3 Sheets-Sheet 3
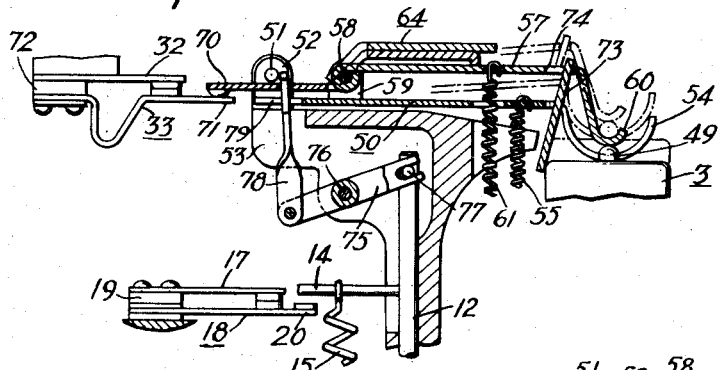
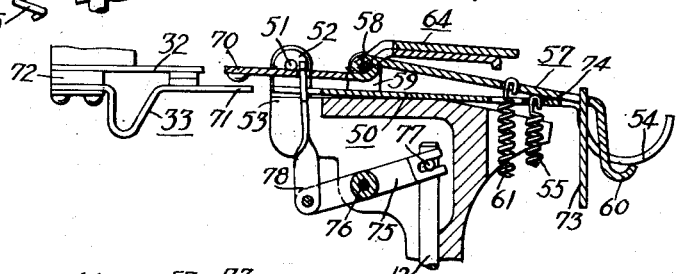
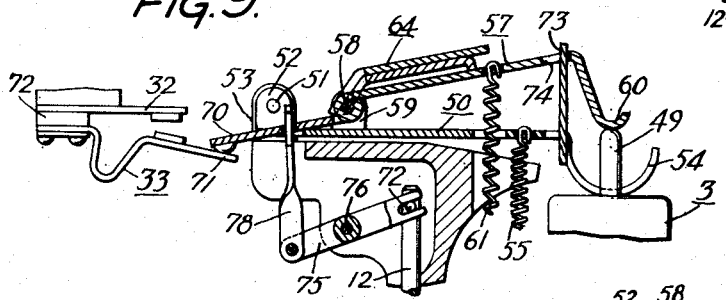
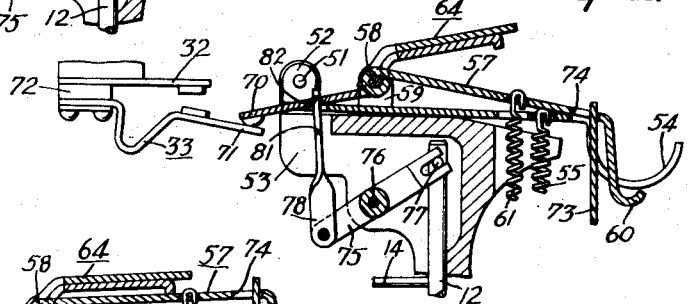
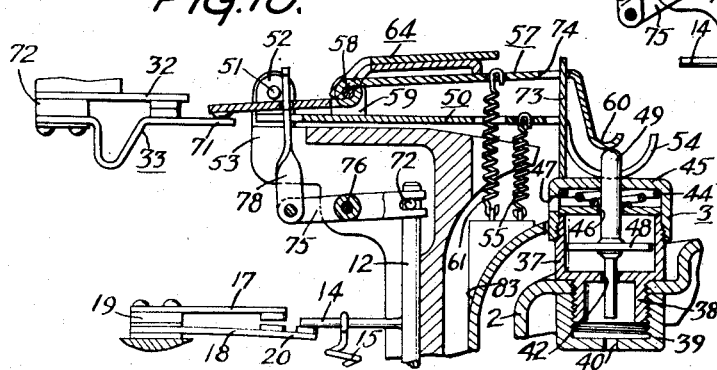

Patented Oct. 20, 1953

2,656,450

UNITED STATES PATENT OFFICE 2,656,450

COOKER CONTROL APPARATUS

Charles Roger Turner, Springfield Township, Montgomery County, Pa., assignor to Proctor Electric Company, Philadelphia, Pa., a corporation of Pennsylvania Application October 24, 1951, Serial No. 252,915

11 Claims. (Cl. 219—43)

This invention relates to control of food cookers and more particularly to control of heat supply to a cooker in response to a variable condition within the cooker. One application of the invention is the control of a pressure cooker in an apparatus of the general character disclosed in the copending application of Charles R. Turner and Paul G. Turner, Serial No. 777,496, filed October 2, 1947.

In that application there is disclosed an apparatus for control of a pressure cooker equipped with a device having a fixed body and a projecting element movable by a variable condition within the cooker. In the form of the apparatus illustrated and described in said application, the pressure cooker is equipped with a valve device which is mounted on the lid of the cooker and which has a projecting element that moves in response to a predetermined pressure within the cooker. In the form of the apparatus illustrated and described in said application, the pressure cooker is equipped with a valve device which is mounted on the lid of the cooker and which has a projecting element that moves in response to a predetermined pressure within the cooker. A control stand, on which the cooker is placed for operation, contains a member which is actuated by said element to initiate a timing operation and to effect reduction of the heat input to the cooker. At the end of the timed cooking operation, the heat is automaticaly cut off and the pressure of the cooker is automatically vented through said valve device. The apparatus also has provision for non-automatic operation with different heat inputs.

In the apparatus of the character above-mentioned, the valve device on the pressure cooker has a fixed body, and it is the movement of the aforementioned valve element relative to said body that effects initiation of the timed cooking operation. However, in manufacture of pressure cookers for use with such apparatus there are bound to be variations, from one cooker to another, in the level of the top of the valve body relative to the bottom of the cooker, and such variations tend to affect the operation because the level of the top of the valve body serves as the reference datum with respect to which the movement of the movable valve element is intended to effect the desired operation.

One object of the invention is to provide, in a condition-responsive cooker control apparatus, an arrangement which will compensate for manufacturing variations that tend to affect the operation of the apparatus.

Another object of the invention is to obviate the deleterious effects of variations in level of the tops of valve bodies on pressure cookers to be used in apparatus of the character above mentioned.

Another object of the invention is to provide an arrangement which will compensate for height variations of the valve devices on pressure cookers for use in such an apparatus.

A further object of the invention is to provide a novel feeler arrangement, in association with the pressure cooker valve, to effect control action substantially independent of the height of the valve.

Other objects and features of the invention will be apparent from the following detailed description with reference to the accompanying drawings.

In the drawings,

Fig. 1 is a small-scale perspective view of an apparatus embodying the present invention;

Fig. 2 is a relatively large-scale sectional view of the portion of the apparatus with which the present invention is concerned, said view being taken centrally through the control head of the apparatus;

Fig. 3 is a sectional view taken along line 3—3 of Fig. 2;

Fig. 4 is a diagrammatic illustration of the electrical circuit;

Fig. 5 is a plan view of the mechanism provided by the present invention, said view being taken along line 5—5 of Fig. 2;

Fig. 6 is a sectional view taken along line 6—6 of Fig. 2;

Fig. 7 is an exploded perspective view of the principal parts of the control mechanism provided by this invention; and Figs. 8 to 12 are similar sectional views, all taken centrally through the control mechanism, showing various operating conditions of the apparatus.

Referring first to Figs. 1 to 4, the apparatus illustrated is generally of the character of that disclosed in the aforementioned copending application, the present invention being directed to the improvements hereinafter described. For the purpose of the present invention, it is unnecessary to illustrate and describe the entire apparatus in detail. Therefore, the apparatus is illustrated only in sufficient detail to enable a clear understanding of the present invention.

As shown in Fig. 1, a pressure cooker 1 is provided which has a removable lid 2 on which there is mounted a special-purpose valve 3. The pressure cooker itself may be of any suitable form, for example, it may be of the type disclosed in my prior Patent No. 2,570,993, issued October 9, 1951. The apparatus for controlling the pressure cooker may comprise a control stand 4 having a base 5 to receive the pressure cooker 1, and also having a standard 6 extending upward from base 5 and provided with a control head 7, the standard and its control head being hollow to accommodate the control mechanism as disclosed in the aforementioned application. An electrical heating ring 8 is provided on the base 5 and serves to supply heat to the cooker 1. A rotatable control knob 9, at the front of base 5, is operable by the user from an "off" position to initiate operation and to set the time of the desired pressure cooking operation, it being well understood that different foods require different cooking times.

As may be seen in Fig. 2, the control knob 9 is mounted on the forward end of a shaft 10 which extends rearwardly to the bottom of the vertical standard 6. A cam 11 on said shaft serves to control the operation through its cooperation with a movable vertical rod 12 disposed within the standard 6, the latter being formed to provide a supporting guideway 13 for said rod. Near its upper end the rod 12 has a laterally extending arm 14 to which is secured the upper end of a strong helical tension spring 15 whose lower end is anchored at 16 to a fixed point of the vertical standard. The spring 15 serves to bias the rod 12 downwardly to maintain engagement of the lower end of the rod with the cam 11, and the spring also effects venting of the pressure cooker at the end of the timed cooking operation, as hereinafter described. The arm 14, in addition to serving as an attachment means for the spring 15, serves to actuate a switch comprising a rigid contact arm 17 and a spring contact arm 18, both switch arms being secured at one end and insulated from one another by means of an insulating mounting stack 19 supported by the vertical standard 6. The contact arm 18 is self-biased upwardly by its own resilience, tending to maintain the switch closed, and said arm has a projecting portion 20 which is actuated by the arm 14 to open the switch, the switch being insulated from arm 14 as by the provision of an insulating button on portion 20.

As may be seen in Fig. 3, the cam 11 has a low point 21 which is engaged by rod 12 when the knob 9 is in "off" position, and at such time the switch 17, 18 is open as shown in Fig. 2. The cam 11 also has a first rise 22 leading to a flat 23, a second rise 24 leading to a flat 25, and a circular portion 26 extending from shoulder 27 to shoulder 28. The principal portion of the cam is the circular portion 26 which is effective during automatic operation. For such operation, the knob 9 is rotated to rotate the cam 11 counterclockwise, as viewed in Fig. 3, until the rod 12 engages the circular portion 26 at a point corresponding to the desired cooking time which is indicated by indicia associated with the control knob. During the automatic operation, the cam is actuated counter-clockwise until the rod 12 reaches shoulder 28 and moves downward to the low point 21, at which time the knob 9 will have been returned to the "off" position. The purpose of the flats 23 and 25 on cam 11 is to enable non-automatic operation whenever desired, as hereinafter described.

The electrical circuit of the apparatus is shown in Fig. 4. The heating unit 8 is supplied from input terminals 29, and the switch 17, 18 is included in series circuit with the heating unit to serve as the off-on switch. A thermal timer, represented diagrammatically at 30, and a solenoid represented at 31, are in series with one another and are included serially in the circuit but are shunted by a switch 32, 33. As described in the aforementioned application, the thermal timer 30 comprises a switch 34, 35 actuated by a bimetal element (not shown) which is heated by a heater 36. With switch 32, 33 closed, the thermal timer 30 is inoperative because it is short-circuited, but when the switch 32, 33 is opened, the thermal timer 30 serves to cyclically open and close the energizing circuit for the heating unit 8, thereby effectively reducing the average wattage input to said heating unit. The cyclic operation of the thermal timer 30 also intermittently energizes the solenoid 31 which serves to actuate a pawl associated with a ratchet (not shown) mounted on the shaft 10. The shaft is thus rotated to move cam 11 to the "off" position. The time required for such movement of the cam is dependent upon the initial setting of the cam by knob 9 and determines the timed cooking interval.

During automatic operation, the closure of the on-off switch 17, 18 through rotation of knob 9, first conditions the circuit as shown in Fig. 4, and full wattage is supplied to the heating unit 8 which rapidly heats the pressure cooker 1. When the pressure within the cooker reaches a predetermined value, switch 32, 33 is opened through action of the valve 3 to initiate the timed cooking operation and to reduce the average wattage input to the heating unit 8. At the end of the timed cooking operation, switch 17, 18 is opened by downward movement of rod 12 as it moves over shoulder 28 of the cam 11, and at the same time the rod 12 serves to vent the pressure of the cooker through the valve 3.

During non-automatic operation, there is no timing action, and the positioning of the cam 11 to render one of the flats 23 and 25 effective merely determines whether or not the switch 32, 33 will be opened or remain closed to give low or high heat. During low heat non-automatic operation, with the switch 32, 33 open, the device 30 effects intermittent energization of the heating unit 8 and also effects intermittent energization of the solenoid 31. However, the ratchet previously mentioned is not stepped because it has a smooth portion which is then adjacent the operating pawl as disclosed in the aforementioned application.

The valve 3, shown in Fig. 2, is of the character employed in the apparatus disclosed in the aforementioned copending application. It comprises a stationary wall-forming member 37 having a threaded portion 38 extending through an opening in the cooker lid 2 and secured by a threaded member 39 having an aperture 40. Member 37 is formed to provide both the bottom and circular wall for a valve chamber 41, being provided with an inlet port 42. A plate 43 is pressed by spring 44 against the top of member 37 and forms the top of the valve chamber. A cap 45 threadedly engages member 37 and retains the spring 44. Plate 43 is apertured to provide an outlet port 46 which communicates with an outlet opening 47 in cap 45. Within the valve chamber 41 is a pressure actuated piston plate 48 and a stem 49 integral therewith, the stem extending through the outlet port 46 and through an aperture in the cap 45 externally of the valve body. In the absence of pressure within the cooker 1, the integral plate 48 and stem 49 are disposed as shown in Fig. 2 under downward pressure applied to the stem 49 by the control mechanism associated with the valve. When the pressure in the cooker rises to a predetermined value, the plate 48 is moved upward and the stem 49 is projected upwardly to initiate the timed cooking operation. In its upper position the plate 48 seals the outlet port 46 and thus retains the pressure within the cooker. In the event that the pressure rises excessively during the cooking operation, plate 43 is forced upwardly against the action of spring 44 to vent the excess pressure through outlet opening 47.

The apparatus thus far described is generally the same as that disclosed in the aforementioned copending application. In accordance with the present invention, an improved mechanism is provided for actuating switch 32, 33 in response to upward movement of valve stem 49 relative to the fixed valve body. This mechanism adjusts itself to the height of the valve body so that its operation is not materially affected by manufacturing variations that are bound to occur from one pressure cooker to another.

Referring particularly to Figs. 2, 5, 6 and 7, a first feeler member 50 is pivoted at one end on transverse pins 51 through turned-up apertured ears 52 on said member, the pins 51 being supported by spaced supported members 53 (Fig. 6) within the hollow head 7 of the vertical standard 6. At its opposite or forward end, member 50 is formed to provide spaced feeler fingers 54 which are adapted to engage the top of the valve body on opposite sides of the projecting stem 49. A helical tension spring 55 has its upper end secured to member 50 through apertures 56, and has its lower end anchored to the vertical standard, the spring serving to bias member 50 downwardly.

A second feeler member 57 has one end pivoted on a pin 58 supported by turned-up apertured ears 59 on member 50 intermediate the ends of the latter. The forward end of member 57 is formed to provide a feeler finger 60 which is adapted to engage the projecting end of the valve stem 49. A helical tension spring 61 has its upper end secured to member 57 through apertures 62, and has its lower end anchored to the vertical standard, the spring serving to bias member 57 downwardly. Member 50 has an aperture 63 through which the spring 61 extends.

Also pivoted on pin 58 is a member 64 which conveniently is composed of two parts 65 and 66 welded together. The member 64 is pivoted intermediate its ends, being formed to provide transverse apertures 67 to accommodate pin 58, and also to provide aperture 68 to accommodate the pivoted end of member 57. Near its forward end, member 64 is provided with a downward extending flange 69 which is adapted to abut against the upper surface of member 57. At its rearward portion, member 64 has a finger 70 which is actuated by an extension 71 of contact arm 33 of the switch 32, 33, the switch being insulated from finger 70 as by an insulating button on the latter. The switch arms are mounted and insulated from one another at 72, and arm 32 is rigid while arm 33 is a spring arm which is biased upwardly by its own resilience. The switch is opened against its self-biasing action by downward movement of finger 70.

At the forward portion of member 57 there is freely suspended a prop element 73, said element extending through an aperture 74 in member 57 and having a head portion to suspend it from said member. The purpose of this prop element will be described presently.

A lever 75 is pivoted on transverse pin 76 supported by the spaced support portions 53 of the vertical standard, and said lever has one end connected to the upper end of rod 12 through a pin and slot connection 77, and has its other end pivotally connected to a vertically disposed actuating member 78. The latter extends upward through a recess 79 of member 50 and through an aperture 80 of member 64. As may be seen in Fig. 6, the actuating member 78 is formed to provide shoulders 81 below member 64 and shoulders 82 above member 64, the purpose of which will be described presently.

Figs. 8, 9 and 10 show the mechanism at different stages of automatic operation of the pressure cooker. In Fig. 8, the pressure cooker has been placed on the control stand, with the valve body and stem engaged by feeler fingers 54 and 60, and the control knob has been turned to a desired position to initiate operation and to set the cooking time. Therefore, switch 17, 18 has been closed by upward movement of rod 12, and it will be noted that member 78 has been moved downward so that its lower shoulders 81 will not interfere with counter-clockwise rotation of members 57 and 64 about pivot 58. At this time, switch 32, 33 is closed.

Fig. 9 shows the mechanism at the start of the timed cooking interval, the valve stem 49 having been projected upwardly relative to the fixed valve body by the pressure within the cooker, the pressure having reached a predetermined value sufficient to overcome the force of spring 61. Due to their association, members 57 and 64 have moved in unison about pivot 58, and finger 70 has opened switch 32, 33. There is no change in the position of rod 12 and member 78 interconnected therewith.

Fig. 10 shows the mechanism at the end of the timed cooking operation. Rod 12 has dropped over shoulder 28 (Fig. 3) of the control cam and has been moved downward by the strong force of spring 15. The downward movement of rod 12 has opened switch 17, 18, and has moved member 78 upwardly through lever 75. The lower shoulders 81 on member 78 have exerted sufficient upward force on member 64 to the left of pivot 58 to force the valve stem 49 downward to the extent permitted by prop element 73 which now abuts against the top of the valve body. The valve is now in venting condition, piston plate 48 being disposed in an intermediate position between the valve ports so that flow of pressure is permitted from inside the pressure cooker through the valve chamber about the piston plate and through the outlet or discharge opening 47. The vented steam passes downward through a passage 83 as in the apparatus of the aforementioned copending application.

From the foregoing description, it will be seen that the main function of the feeler mechanism in the apparatus illustrated is to initiate timing and reduced heat input in response to movement of the movable valve element when the pressure within the cooker reaches a predetermined value. Moreover, it is important that the height of the valve, within the range of manufacturing tolerances, shall not significantly affect the operation. The feeler mechanism provided by this invention effectively feels the top of the valve body and adjusts itself accordingly, and its operation is not significantly altered by this self-adjustment.

As may be seen particularly in Figs. 8 and 9, the feeler mechanism is such that the height of valve 3 may vary considerably without affecting the operation. It should be noted that the valve body is a stationary part of the cooker. As the height of the valve 3 is increased, as represented by the dot-and-dash outline in Fig. 8, the feeler member 50 is moved upward about its pivot 51, and it carries upward the pivot 58 of the feeler assembly which is actuated by the valve stem. Consequently, the position of finger 70 is substantially unchanged in relation to the projection 71 of switch 32, 33. Moreover, the amount of movement of finger 70 by a given movement of the valve stem is substantially the same regardless of the position of the feeler member 50. Furthermore, the venting action through movement of rod 12 is made more accurate by the self-adjustment of the feeler mechanism according to the height of the valve 3.

During non-automatic operation, the feeler mechanism is not required to initiate timing and reduced heat input but it is required to actuate switch 32, 33 for low-heat operation. It is to be understood that non-automatic operation can be used for controlled heating of any cooking vessel. Figs. 11 and 12 show the feeler mechanism during non-automatic operation of the apparatus for high and low heats, respectively.

For high heat operation, the control knob 9 is turned sufficiently to render the flat 23 on cam 11 (Fig. 3) effective, and the rod 12 (Fig. 11) is not raised sufficiently to cause opening of switch 32, 33. Consequently, the heating unit 8 is energized at full wattage and remains so energized until the user turns the knob 9 to the "off" position.

For low heat operation, knob 9 is rotated to a position to render flat 25 effective, and rod 12 is raised sufficiently to open switch 32, 33 as shown in Fig. 12. This is accomplished through the upper shoulders 82 on the actuating member 78, which shoulders engage member 64 and rotate the same counter-clockwise about pivot 58, causing finger 70 to engage the projection 71 on switch arm 33 so as to open the switch contacts. Consequently, the heating unit 8 is intermittently energized to supply a predetermined lower average wattage thereto. This operation continues until the user moves the control knob to "off" position.

Thus, it will be seen that the feeler mechanism provided by the invention enables non-automatic operation as well as automatic operation of an apparatus of the general character disclosed in the aforementioned copending application.

While a particular embodiment of the invention has been illustrated and described, the invention is not limited thereto, but is capable of such further embodiments as may occur to those skilled in the art. The invention, in its broader aspect, contemplates an arrangement which will compensate for manufacturing variations and give accurate control of a cooker in response to a condition change within the cooker. It should be noted also that the feeler mechanism may be modified without departing from the invention.

I claim:

1. In an apparatus for control of a cooker equipped with a device having a fixed body and a projecting element movable by a variable condition within the cooker, a control stand including a base to receive the cooker and a standard extending upward from said base, electrical heating means on said base, a switch on said standard to be actuated in response to movement of said element relative to said body, the switch being in circuit with said heating means to effect desired control thereof, a member movably supported on said standard for engagement with said body, spring means biasing said member in the direction of engagement thereof with said body, means movably supported on said member to actuate said switch and including a member engageable with said element for operation thereby, and spring means biasing said last member in the direction of engagement with said element, said actuating means being effective to actuate said switch irrespective of the position of said first member as determined by said body.

2. In an apparatus for control of a cooker equipped with a device having a fixed body and a projecting element movable by a variable condition within the cooker, a control stand including a base to receive the cooker and a standard extending upward from said base, electrical heating means on said base, a switch on said standard to be actuated in response to movement of said element relative to said body, the switch being in circuit with said heating means to effect desired control thereof, a member pivotally supported on said standard for engagement with said body, spring means biasing said member in the direction of engagement thereof with said body, means pivotally supported on said member to actuate said switch and including a member engageable with said element for operation thereby, and spring means biasing said last member in the direction of engagement with said element, said actuating means being effective to actuate said switch irrespective of the position of said first member as determined by said body.

3. In an apparatus for control of a cooker equipped with a device having a fixed body and a projecting element movable by a variable condition within the cooker, a control stand including a base to receive the cooker and a standard extending upward from said base, electrical heating means on said base, a switch on said standard to be actuated in response to movement of said element relative to said body, the switch being in circuit with said heating means to effect desired control thereof, a member pivotally supported at one end on said standard and having its other end arranged to engage said body, spring means biasing said member in the direction of engagement thereof with said body, means pivotally supported on said member intermediate the ends of said member to actuate said switch and including a member engageable with said element for operation thereby, and spring means biasing said last member in the direction of engagement with said element, said actuating means being effective to actuate said switch irrespective of the position of said first member as determined by said body.

4. In an apparatus for control of a cooker equipped with a device having a fixed body and a projecting element movable by a variable condition within the cooker, a control stand including a base to receive the cooker and a standard extending upward from said base and having a hollow control head with an opening, electrical heating means on said base, a switch within said control head to be actuated in response to movement of said element relative to said body, the switch being in circuit with said heating means to effect desired control thereof, a member movably supported within said control head and engageable with said body through said opening, spring means biasing said member in the direction of engagement thereof with said body, means movably supported on said member within said control head to actuate said switch and including a member engageable with said element through said opening for operation by said element, and spring means biasing said last member in the direction of engagement with said element, said actuating means being effective to actuate said switch irrespective of the position of said first member as determined by said body.

5. In an apparatus for control of a cooker equipped with a device having a fixed body and a projecting element movable by a variable condition within the cooker, a control stand including a base to receive the cooker and a standard extending upward from said base and having a hollow control head with an opening, electrical heating means on said base, a switch within said control head to be actuated in response to movement of said element relative to said body, the switch being in circuit with said heating means to effect desired control thereof, a member pivotally supported at one end within said control head and having its other end arranged to engage said body through said opening, spring means biasing said member in the direction of engagement thereof with said body, means pivotally supported on said member intermediate its ends within said control head to actuate said switch and including a member engageable with said element through said opening for operation by said element, and spring means biasing said last member in the direction of engagement with said element, said actuating means being effective to actuate said switch irrespective of the position of said first member as determined by said body.

6. In an apparatus for control of a pressure cooker equipped with a valve having a fixed body and a projecting element movable in one direction by pressure within the cooker and movable in the opposite direction by external force to vent the pressure of the cooker, support means to receive the cooker, means for controlling heat supply to said cooker including a control member to be actuated in response to movement of said element in said first direction relative to said body, a movably supported second member biased to engage said body, means movably supported on said second member to actuate said control member and including a member biased to engage said element for operation thereby, said actuating means being effective to actuate said control member irrespective of the position of said second member as determined by said body, and means for moving said actuating means in a direction to move said element to pressure venting position.

7. In an apparatus for control of a pressure cooker equipped with a valve having a fixed body and a projecting element movable in one direction by pressure within the cooker and movable in the opposite direction by external force to vent the pressure of the cooker, a control stand including a base to receive the cooker and a standard extending upward from said base, electrical heating means on said base, a switch on said standard to be actuated in response to movement of said element relative to said body, the switch being in circuit with said heating means to effect desired control thereof, a member pivotally suported on said standard for engagement with said body, spring means biasing said member in the direction of engagement thereof with said body, means pivotally supported on said member to actuate said switch and including a member engageable with said element for operation thereby, spring means biasing said last member in the direction of engagement with said element, said actuating means being effective to actuate said switch irrespective of the position of said first member as determined by said body, and means for moving said actuating means in a direction to move said element to pressure venting position.

8. In an apparatus for control of a pressure cooker equipped with a valve having a fixed body and a projecting element movable in one direction by pressure within the cooker and movable in the opposite direction by external force to vent the pressure of the cooker, a control stand including a base to receive the cooker and a standard extending upward from said base and having a hollow control head with an opening, electrical heating means on said base, a switch on said standard to be actuated in response to movement of said element relative to said body, the switch being in circuit with said heating means to effect desired control thereof, a member pivotally supported within said control head and engageable with said body through said opening, spring means biasing said member in the direction of engagement thereof with said body, means pivotally supported on said member within said control head to actuate said switch and including a member engageable with said element through said opening for operation thereby, spring means biasing said last member in the direction of engagement with said element, said actuating means being effective to actuate said switch irrespective of the position of said first member as determined by said body, and means for moving said actuating means in a direction to move said element to pressure venting position.

9. In an apparatus for control of a pressure cooker equipped with a valve having a fixed body and a projecting element movable in one direction by pressure within the cooker and movable in the opposite direction by external force to vent the pressure of the cooker, a control stand including a base to receive the cooker and a standard extending upward from said base and having a hollow control head with an opening, electrical heating means on said base, a switch on said standard to be actuated in response to movement of said element relative to said body, the switch being in circuit with said heating means to effect desired control thereof, a member pivotally supported within said control head and engageable with said body through said opening, spring means biasing said member in the direction of engagement thereof with said body, means pivotally supported on said member within said control head to actuate said switch and including a member engageable with said element through said opening for operation thereby, spring means biasing said last member in the direction of engagement with said element, said actuating means being effective to actuate said switch irrespective of the position of said first member as determined by said body, a rotatable cam, and means controlled by said cam for moving said actuating means in a direction to move said element to pressure venting position.

10. In an apparatus for control of a cooker having a fixed part and an element movable relative to said part in response to conditions within the cooker; a support structure to receive the cooker; means on said support structure to control the operation of said cooker; and a feeler mechanism for effecting operation of said control means solely in response to movement of said element relative to said fixed part, said feeler mechanism comprising a first movable feeler means engageable with said fixed part to establish an operating reference position, and a second movable feeler means adjustable by said first feeler means and movable by said element relative to said first feeler means to effect operation of said control means.

11. Apparatus according to claim 10, wherein said first feeler means includes a spring-biased pivoted member, and said second feeler means includes a spring-biased member pivotally mounted on said first member intermediate the ends thereof.

CHARLES ROGER TURNER.

References Cited in the file of this patent

UNITED STATES PATENTS

| Number | Name | Date |
|---|---|---|
| 1,093,003 | McCaskey | Apr. 14, 1914 |
| 2,350,941 | Stevenson | June 6, 1944 |
| 2,472,451 | Whitney | June 7, 1949 |
| 2,507,666 | Goldthwaite | May 16, 1950 |